United States Patent [19]

Sweeney

[11] 4,114,912
[45] Sep. 19, 1978

[54] SLED APPARATUS

[76] Inventor: James E. Sweeney, 78 Crescent Dr., Mundelein, Ill. 60060

[21] Appl. No.: 845,817

[22] Filed: Oct. 27, 1977

[51] Int. Cl.² .............................................. B62B 13/12
[52] U.S. Cl. .............................. 280/12 KL; 280/21 R
[58] Field of Search ............. 280/12 KL, 21 R, 21 A, 280/16

[56] References Cited

U.S. PATENT DOCUMENTS

| | | | |
|---|---|---|---|
| 2,099,731 | 11/1937 | Gelbman | 280/12 KL |
| 2,247,182 | 6/1941 | Bosca | 280/21 R |
| 2,443,348 | 6/1948 | Flajole | 280/12 KL |
| 3,139,287 | 6/1964 | Annis | 280/21 R |
| 3,666,281 | 5/1972 | Billings | 280/12 KL |

*Primary Examiner*—Robert R. Song
*Attorney, Agent, or Firm*—Cook, Wetzel & Egan, Ltd.

[57] ABSTRACT

An improved sled apparatus of the ski-type having a main ski bearing a seat and a foot retainer thereon, and steerable upon flanking outrigger auxiliary skis by means of a preferably unitary handlebar assembly operatively interconnected to a pivotable stabilizer bar assembly.

6 Claims, 2 Drawing Figures

SLED APPARATUS

BACKGROUND OF THE INVENTION

1. Field

The present invention pertains generally to the sled art and more particularly to an improved ski-like sled for transporting an individual over a snow-covered ground surface.

2. State of the Art

Various types of recreational sleds have been known to the art, including several having ski-like runners. U.S. patents in and around the sled art include the following:

(1) U.S. Pat. No. 1,672,782 to Ring,
(2) U.S. Pat. No. 2,043,374 to Gelbman,
(3) U.S. Pat. No. 2,247,182 to Bosca,
(4) U.S. Pat. No. 2,443,348 to Flajole,
(5) U.S. Pat. No. 2,616,715 to Billings,
(6) U.S. Pat. No. 3,026,120 to Guerard,
(7) U.S. Pat. No. 3,666,281 to Billings.

Whereas some of the aforementioned patents describe sled devices which have been generally usable for transporting an individual over a snow-covered surface, an object of the present invention is to provide an improved recreational sled having improved stability, improved responsiveness to selective directional control, increased simplicity of operation, increased strength of construction and increased stability during use.

Another object of the present invention is to provide a sled apparatus having a main ski flanked by outrigger auxiliary skis which are interconnected with the main ski and which may be reciprocally lowered and raised as a pair by means of a force directed to hand-held control means for changing the direction of travel of the sled apparatus.

A further object of the present invention is to provide an improved sled apparatus having a stabilizer bar interconnecting the outrigger auxiliary skis, which stabilizer bar is yokably engaged for transmitting a steering force to one or the other of the auxiliary skis.

A yet further object of the present invention is to provide in a preferred embodiment an improved sled apparatus having a fulcrum-supported, unitary handle bar assembly connected to the stabilizer bar for two-handed control of steering.

BRIEF SUMMARY OF THE INVENTION

The improved sled apparatus of the present invention includes a main ski with an upwardly curving main ski tip and a main ski body extending longitudinally rearward thereof. The main ski body has an under surface adapted for contacting a snow-covered ground surface and an upper surface for carrying a seat, foot retainer, a yokably supported stabilizer assembly, and a pivotably-supported unitary handlebar assembly.

The stabilizer assembly includes outrigger auxiliary skis disposed on each transverse side of the main ski body. Each end of a stabilizer bar is attached to an auxiliary ski and pivot means therefor is provided for yokably engaging the central portion of the stabilizer bar and for pivoting the stabilizer bar upon an axis longitudinal of the main ski runner.

A preferably unitary handlebar assembly is attached to the stabilizer bar substantially near the downwardly directed end portions thereof and extends forwardly and generally longitudinally of the main ski body for transmitting a selectively applied downward force to the stabilizer bar end portions to pivot the stabilizer bar about the pivot means, whereby the direction of travel of the sled apparatus may be controlled.

Various modifications of the improved sled apparatus of the present invention are intended to be embodied and will become apparent to those skilled in the art from the teaching of the principles of the invention in connection with the disclosure of the specification, the claims and the drawing.

DETAILED DESCRIPTION OF THE PREFERRED EMBODIMENTS

The improved sled apparatus of the present invention includes a main ski with an upwardly curving main ski tip and a main ski body extending longitudinally rearward thereof. The main ski body has an under surface adapted for contacting a snow-covered ground surface and an upper surface. Disposed on the upper surface is a seat for carrying the rider and a foot retainer for supporting the rider's feet, which retainer is disposed between the main ski tip and the seat.

The sled stabilizer assembly includes right- and left-hand auxiliary skis disposed transversely on each side of the main ski body and interconnected by a stabilizer bar, which is attached at either end to the right- and left-hand auxiliary skis. The stabilizer bar is yokably engaged at a central portion thereof by means of a pivot bracket. Right- and left-hand handlebars are attached to the stabilizer bar near the ends thereof and extend forwardly thereof and generally longitudinally to the main ski body for transmitting a selectively applied downward force to the stabilizer bar, and thereby to either of the right- or left-hand auxiliary skis. Such a downward force on an auxiliary ski results in the sled turning in that direction.

It is also contemplated as being within the scope of the invention in preferred embodiments for the right- and left-hand handlebars to extend transversely of the main ski body and to be joined to form a unitary stabilizer assembly for providing stability and strength to the handlebars and support to the stabilizer bar assembly. It is also contemplated that the unitary handlebar assembly may angle downwardly for joining in a fulcrum on the main ski body, whereby the handlebar means is pivotably supported on the main ski body when a directional force is applied to the stabilizer bar for turning the sled. The handlebar fulcrum may be restrained from upward movement to provide yet greater strength to the handlebar and stabilizer bar assemblies by means of a fulcrum bracket attached to the main ski body upper surface.

Figure 1:
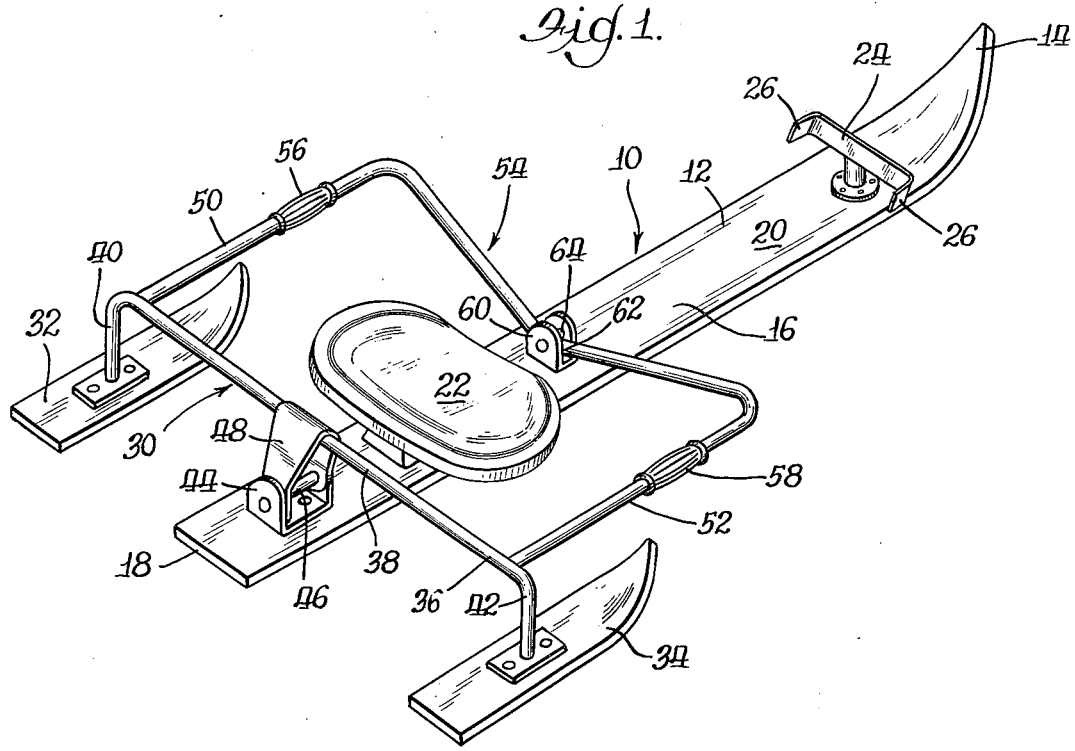
FIG. 1 is a perspective view of the improved recreational sled apparatus of the present invention showing the main ski bearing a seat on the upper surface thereof, a foot retainer disposed between the tip and the seat for supporting the feet of the rider, and a stabilizer assembly comprising a pair of outrigger auxiliary skis disposed on each side of the main ski body, the stabilizer bar attached to both auxiliary ski runners, pivot means yokably engaging and pivoting the stabilizer bar about an axis longitudinal of the main ski runner, and an unitary handlebar assembly attached to the stabilizer bar for transmitting a directional force to the stabilizer bar to exert a downward force on one of the outrigger auxiliary skis for changing the direction of travel of the sled apparatus.

Referring now to the drawing and FIG. 1 in particular, the improved sled apparatus of the present invention, generally designated at 10, includes a main ski 12 having an upwardly curving main ski tip 14 and a main ski body 16 extending longitudinally rearward thereof. Main ski body 16 has an undersurface 18 adapted for contacting a snow-covered ground surface and an upper surface 20. A seat 22 is disposed upon and carried by main ski body 16 on upper surface 20 thereof. A foot retainer 24 preferably including side hook portions 26 for securably engaging and holding the feet of the rider is disposed on upper surface 20 of main ski body 16 between main ski tip 14 and seat 22.

Improved sled apparatus 10 of the present invention further includes a stabilizer assembly generally designated at 30. Stabilizer assembly 30 includes left and right outrigger auxiliary skis 32, 34 disposed on each side transversely of main ski body 16 and generally rearwardly of seat 22. Stabilizer bar 36 having an upwardly disposed central portion 38 and left and right end portions 40, 42 is attached respectively to left and right auxiliary skis 32, 34. A pivot bracket 44 is attached to and carried by upper surface 20 of main ski body surface 20 for supporting a stationarily disposed pivot bar 46 which extends longitudinally to main ski body 16. A stabilizer bracket 48, which is generally V-shaped in cross-section, is mounted on bar 46 for pivoting thereon. A stabilizer bracket 48 is attached to the central portion 38 of stabilizer bar 36 for permitting pivoting motion thereof.

Left and right handlebars 50, 52 are attached to stabilizer bar 36 near left and right downwardly extending end portions 40, 42, and extend forwardly thereof and generally longitudinal of the main ski body 16. In preferred embodiments, left and right handlebars 50, 52 may further extend laterally of and transect main ski body 16 for joining above main ski body 16 to provide a unitary handlebar assembly, generally designated at 54. Hand grips 56, 58 are provided for the rider to hold and to apply a directional force to handlebars 50, 52.

The improved sled apparatus of the present invention also contemplates provision for a fulcrum bracket 60 disposed on and upwardly projecting from main ski body 16 for engaging the fulcrum 62 of unitary handlebar assembly 54 and confining such assembly 54 by means of fulcrum confining bar 64 preferably disposed longitudinally of main ski body 16.

Figure 2:
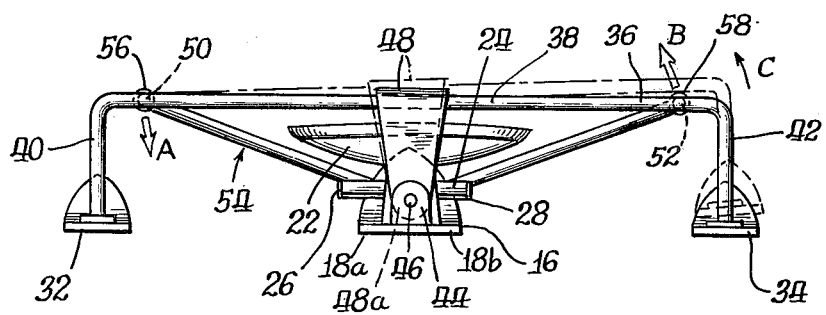
FIG. 2 is a rear elevational view showing the mechanism of the improved recreational sled apparatus to effect a turn to the left in which a downward directional force is transmitted from the stabilizer bar onto the left auxiliary ski by means of a downward force on the left handle grip which causes an upward movement of the right-hand auxiliary ski and results in a turn to the left.

Referring now to FIG. 2, wherein the functioning of stabilizer assembly 30 in conjunction with unitary handlebar assembly 54 is shown, a downward force represented by arrow A is directed on hand grip 56, and/or an upward force represented by arrow B is directed on hand grip 58. The result is to pivot stabilizer bar assembly 30 in a counterclockwise direction as represented by arrow C in FIG. 2. Stabilizer bracket 48, which is secured to central portion 38 of stabilizer bar 36, pivots about pivot bar 36 at a lower portion 48a thereof, thereby to raise right outrigger auxiliary ski 34 from the ground surface or to lessen the weight normally borne thereby. The result is increased weight on the left side 18a of under surface 18 and decreased weight on the right side 18b of under surface 18. Meanwhile, unitary handle bar assembly 54, which is attached to stabilizer bar 36, is likewise pivoted in a counterclockwise direction by means of fulcrum 62 resting on main ski body 16. The net result of the above forces, pivoting motions and changes in distribution of weight is to cause the sled 10 to turn to the left, as shown in FIG. 2.

Although metal, rigid and resilient plastics and wood are preferred for main ski 12, outrigger auxiliary skis 32, 34, seat 22 and foot retainer 24; pivot bracket 44, pivot bar 46, stabilizer bracket 48, fulcrum bracket 60, fulcrum confining bar 64, as well as unitary handlebar assembly 54 and stabilizer bar 36, are preferably made of metal.

The improved sled of the apparatus 10 of the present invention may be constructed in a variety of sizes and shapes, depending on the height and weight of the intended rider, with 6 feet being generally a suitable length for main ski 12.

The basic and novel characteristics of the improved sled apparatus of the present invention and the advantages thereof will be readily understood from the foregoing disclosure by those skilled in the art. It will become readily apparent that various changes and modifications may be made in the form, construction and arrangement of the improved sled apparatus set forth hereinabove without departing from the spirit and scope of the invention. Accordingly, the preferred and alternative embodiments of the present invention set forth hereinabove are not intended to limit such spirit and scope in any way.

What is claimed is:

1. An improved sled apparatus for carrying a rider over a snow-covered ground surface, said sled apparatus comprising:

a main ski having an upwardly curving main ski tip and a main ski body extending longitudinally rearward thereof, said main ski body having an under surface adapted for contacting the snow-covered ground surface and an upper surface;

a seat carried by the main ski body on the upper surface thereof;

foot retainer means carried by the main ski body on the upper surface thereof and disposed between the main ski tip and the seat for resting and holding the feet of the rider; and a stabilizer assembly comprising:

outrigger auxiliary skis, at least one of which is disposed on each side transversely of the main ski body;

a stabilizer bar having an upwardly disposed central portion and two downwardly disposed end portions, said stabilizer bar attached at each downwardly disposed end portion to an auxiliary ski;

pivot means for yokably mounting the central portion of said stabilizer bar on said main ski body and for pivoting said stabilizer bar about an axis longitudinal of said main ski body; and handlebar means attached to said stabilizer bar substantially near the downwardly disposed end portions thereof and extending forwardly thereof and generally longitudinal of said main ski body for transmitting a selectively applied directional force to the stabilizer bar about said pivot means whereby the direction of travel of said sled apparatus may be controlled.

2. The improved sled apparatus of claim 1 wherein said pivot means comprises a pair of support brackets fixedly attached to and depending upwardly from the main ski body for supporting a stationarily disposed bar which extends longitudinally of the main ski body, and a stabilizer bracket generally V-shaped in cross-section mounted on the bar for pivoting thereon, said stabilizer bracket attached to said stabilizer bar for transmitting pivoting motion thereto.

3. The improved sled apparatus of claim 1 wherein said handlebar means further extend laterally of, transect and join above said main ski body to form a unitary handlebar assembly.

4. The improved sled apparatus of claim 3 further comprising auxiliary pivot means disposed on said main ski body for yokably engaging said unitary handlebar assembly to hold said unitary handlebar assembly firmly relative to said main ski body and to restrict motion of said unitary handlebar means away from said main ski body.

5. The improved sled apparatus of claim 4 wherein said unitary handlebar assembly includes means angling downwardly for abutting on the main ski body in a fulcrum to support said unitary handlebar assembly on said main ski body for rocking about an axis longitudinal to said main ski body when a directional force is applied to said stabilizer bar for turning said sled.

6. The improved sled apparatus of claim 4 wherein said auxiliary pivot means further comprises fulcrum bracket means for restraining upward movement of the fulcrum of said unitary handlebar assembly away from said main ski body.

* * * * *